United States Patent

[11] 3,628,074

| [72] | Inventor | Orazio Fabbrini<br>Via Barromini 35, Varese, Italy |
|------|----------|----------------------------------------------------|
| [21] | Appl. No.| 885,399 |
| [22] | Filed    | Dec. 16, 1969 |
| [45] | Patented | Dec. 14, 1971 |
| [32] | Priority | Dec. 19, 1968 |
| [33] |          | Italy |
| [31] |          | 25316 A/68 |

[54] SATURABLE REACTOR FOR INDUCTION MOTORS, MAGNETICALLY IN SHUNT TO THE MAIN CIRCUIT
3 Claims, 5 Drawing Figs.

[52] U.S. Cl............................................. 310/72,
318/243
[51] Int. Cl....................................... H02k 11/00
[50] Field of Search........................................ 310/72,
190, 191, 209, 212, 112, 119, 116; 318/214, 232,
238, 243

[56] References Cited
UNITED STATES PATENTS

| 1,650,142 | 11/1927 | Martin........................... | 318/243 |
| 1,919,774 | 7/1933  | Chew............................ | 318/243 |
| 2,727,198 | 12/1955 | Lewus........................... | 310/72  |
| 2,912,631 | 11/1959 | Luenberger................. | 310/190 X |
| 3,114,094 | 12/1963 | Lee.............................. | 318/238 |
| 3,254,288 | 5/1966  | Hutson......................... | 318/243 |
| 3,293,468 | 12/1966 | Alger............................ | 310/72 X |
| 3,403,313 | 9/1968  | Pansini......................... | 318/243 X |

Primary Examiner—D. F. Duggan
Attorney—Michael S. Striker

ABSTRACT: A saturable reactor for induction motors is provided, by which the rotor currents and consequent stator currents of the motor at the start, together with the variation of the working point of the motor and the correction of the power factor is obtained, the stator winding of the motor being also the stator winding of the saturable reactor.

Patented Dec. 14, 1971 3,628,074
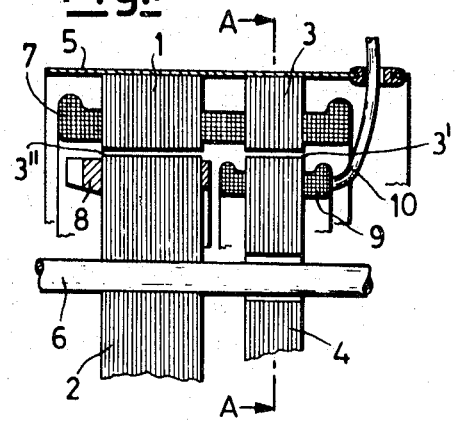
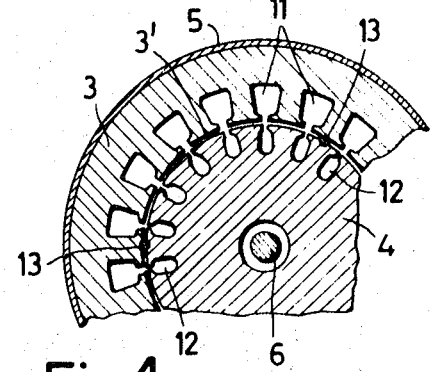
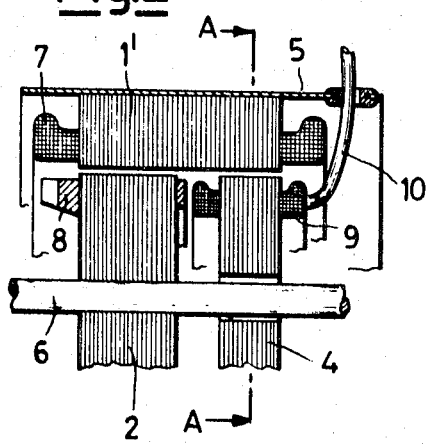
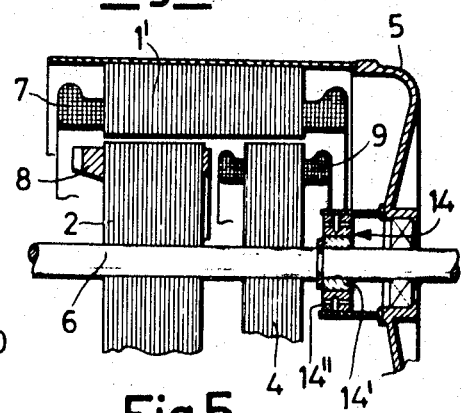
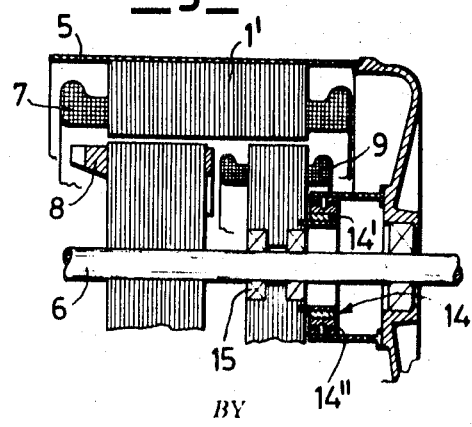
INVENTOR.
ORAZIO FABBRINI

SATURABLE REACTOR FOR INDUCTION MOTORS, MAGNETICALLY IN SHUNT TO THE MAIN CIRCUIT

The invention subject of this application relates to a saturable reactor composed of one stator stack or outer annular member and one rotor stack or core member separated by an airgap, in the slots of which are located the respective windings i.e., of one stator winding connected to an alternate current, and at least one rotor winding connected to a unidirectional current; the rotor stack being mounted on the common shaft, separated from the rotor of the motor and coaxial to it, while the stator stack realizes a magnetic circuit parallel to the main circuit; the stator winding of the saturable reactor being formed by the motor stator winding itself.

The stator stack, made of laminations identical to those of the stator of the motor, is preferably mounted separated from the motor stator stack and coaxial to it, but can also abut against the stator of the motor.

According to the purpose, the rotor stack or core member can either be fixed to the fixed structure, i.e., the shell or stator stack, or rigidly fixed to the motor shaft and rotating with it; or even idling on the motor shaft. Naturally, in the last two cases specific devices for the electrical connection between the moving rotor circuit and the winding of the stator will be necessary.

The above-mentioned saturable reactor can be applied to single and multiphase induction motors, in order to uninterruptedly adjust the useful flux and to limit the rotor starting current in the squirrel cage motors in the place of the usual devices where resistances, autotransformers or saturable reactors made of cores are used having the main windings connected in series to the supply line and the stator winding of the motor.

In the case of the rotor stack being fixed to the fixed structure, the invention can be used to correct the power factor of the motor; in order to obtain this, the rotor stack is made to have the same number of magnetic poles as the stator.

In the case of the rotor stack rigidly fixed to the fixed structure, the invention can be used as a current limiting starter and speed regulator in the motors coupled to fans, pumps or any other machine where there is a nonlinear function between the mechanical power required and the r.p.m.; as the motor, supplied with a saturable reactor, is adjustable to the various characteristics of the coupled parts.

In the case of the rotor stack rigidly fixed to the motor shaft, the invention can be used to automatically adjust the motor speed; for this purpose the rotor stack or core being supplied with at least two windings, one of which has a different number of poles from the stator and the other one has the same number of poles as the stator, and is therefore fit to transmit a signal.

The attached drawings show some nonrestrictive types of construction, that is:

FIG. 1 is a partial longitudinal section with separated stator stack where the rotor stack is attached to the corresponding stator stack;

FIG. 2 is a partial longitudinal section with only one stator;

FIG. 3 is a transversal section following the A—A line of FIG. 1 or 2;

FIG. 4 is a partial longitudinal section with the rotor stack fixed to with the motor shaft;

FIG. 5 is a partial longitudinal section with the rotor stack idling on the motor shaft.

With reference to FIG. 1, the unit is formed by the stator 1 of the motor and the relative rotor 2 shrink-fitted on the shaft 6 and the stator stack 3 and rotor stack 4 of the saturable reactor; where 3' is the airgap between stacks 3 and 4 of the reactance, and 3" is the airgap between stacks 1 and 2 of the stator.

Following this particular type of construction, the stator stacks 1 and 3 of the motor and of the saturable reactor, both of identical laminations and attached to shell 5 of the motor, are arranged side by side but separated and have a common winding 7 which is connected to a supply line carrying an alternate current.

The rotor stack 4 has its windings 9 connected to the leads 10; without requiring slip rings or similar collectors, since said rotor stack 4 is fixed to the corresponding stator stack 3.

Number 8 indicates the electrical circuit of the rotor 2 of the motor, shown here in a schematic form.

FIG. 2 shows a second type of construction of stator stack 1', where the stator magnetic circuits of the motor and the saturable reactor, are assembled in a single unit, and the rotor stack 4 is, as before fixed to the stator stack 1'.

In the FIG. 2 above, in order to block the stator stack 1' (or 3—FIG. 1) and the rotor stack 4, as shown in FIG. 3, pins 13, preferably of nonmagnetic material, are inserted at regular intervals along the airgap 3', embedded and locked on the end laminations of stack 1' (or 3—FIG. 1) in the free spaces between slots 11 of the stator stack 1' (or 3—FIG. 1) and slots 12 of the rotor stack 4.

FIGS. 4 and 5 show two further types of construction respectively with rotor stack 4 shrink-fitted on shaft 6 (FIG. 4), and rotor stack 4 idling on shaft 6 (FIG. 5), on these two drawings having been omitted the arrangements of the stator stacks 3 and 1 separated from each other, already fully described.

To connect the windings with the rotor stack 4 it is here necessary to use the specific devices 14, i.e., sliprings and sliding contacts 14" in two or more pairs, depending on the current value on the brushes.

With reference to FIG. 4 in which the rotor stack 4 is shrink-fitted on shaft 6, the slipring 14' is fixed to the shaft 6 and sliding contacts 14" to shell 5 of the motor; in the case shown in FIG. 5, the rotor stack 4 is idling on shaft 6 by means of bearings 15, and slipring 14' is fixed to the rotor stack 4.

The rotor circuit input is provided either by an outside generator, or preferably by connecting it to the motor supply line taking care of previously interposing the usual transforming and rectifying devices.

The present invention is based on the principle that the limitation of the rotor currents and consequent stator currents of the motor at the start, variation of the working point of the motor on the mechanical performance indicated by the curve of the speed and the torque values, together with the power factor correction, can be obtained by acting on the main magnetic circuit, causing the increase or decrease of the useful flux by exciting or deenergizing the magnetic circuit of the saturable reactor.

What is claimed is:

1. In an apparatus of the character described, a combination comprising motor means having a stator provided with a flux-inducing stator winding adapted to be connected to a source of alternating current, a rotor coaxially arranged with said stator and separated therefrom by an airgap, and a shaft coaxially extending through and fixed to said rotor; and a saturable reactor comprising an annular outer member of magnetizable material coaxial with said shaft, a core member of magnetizable material coaxially arranged within said annular outer member and separated by a second airgap therefrom, said members being formed with circumferentially spaced slots extending from said second airgap respectively into said members, said flux-inducing winding of said stator extending through the slots in said outer annular member of said reactor so as to form in the latter a magnetic circuit parallel to that of said motor, and two different windings in the slots of said core member connected to a direct current so that the magnetic flux produced by the direct current flowing through said core windings will pass in radial direction through said second airgap to thereby saturate said core member and said outer annular member to a degree depending on the direct current supplied, one of said windings in said core member being arranged to provide in said core member a first number of poles equal to the number of poles provided in said outer annular member by said stator winding, and the other of said windings to provide in said core member a second number of poles different from that in said outer annular member.

2. A combination as defined in claim 1, wherein said core member is formed with a central bore of a diameter larger than the outer diameter of said shaft so that the latter may freely rotate relative to said core member, and including means connected to said core member for holding the latter stationarily.

3. A combination as defined in claim 2, wherein said means for holding said core member stationarily comprise pins of nonmagnetic material connecting said core member to said outer annular member.

* * * * *